US009847951B2

United States Patent
Htay et al.

(10) Patent No.: US 9,847,951 B2
(45) Date of Patent: Dec. 19, 2017

(54) DYNAMIC BANDWIDTH ALLOCATION SYSTEMS AND METHODS USING CONTENT IDENTIFICATION IN A SOFTWARE-DEFINED NETWORKING CONTROLLED MULTI-LAYER NETWORK

(71) Applicants: Aung Htay, Alpharetta, GA (US); Paul Hudgins, Roswell, GA (US); Mallikarjunappa Kore, Alpharetta, GA (US)

(72) Inventors: Aung Htay, Alpharetta, GA (US); Paul Hudgins, Roswell, GA (US); Mallikarjunappa Kore, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 460 days.

(21) Appl. No.: 14/071,224

(22) Filed: Nov. 4, 2013

(65) Prior Publication Data
US 2015/0127805 A1    May 7, 2015

(51) Int. Cl.
*G06F 15/173* (2006.01)
*H04L 12/28* (2006.01)
(Continued)

(52) U.S. Cl.
CPC .......... *H04L 47/70* (2013.01); *H04L 43/0876* (2013.01); *H04L 47/10* (2013.01); *H04L 65/60* (2013.01)

(58) Field of Classification Search
CPC .......... H04L 41/0213; H04L 29/08072; H04L 29/06; H04L 41/22; H04L 41/12;
(Continued)

(56) References Cited

U.S. PATENT DOCUMENTS 8,456,984 B2    6/2013  Ranganathan et al.
8,499,355 B1 *  7/2013  Goncharov ............ G06F 21/44
                                                726/25

(Continued)

FOREIGN PATENT DOCUMENTS

WO    2013108121 A2    7/2013

OTHER PUBLICATIONS

Nov. 21, 2014 International Search Report issued in International Application No. PCT/US2014/054248.
(Continued)

*Primary Examiner* — Mahran Abu Roumi
(74) *Attorney, Agent, or Firm* — Clements Bernard Walker PLLC; Christopher L. Bernard; Lawrence A. Baratta, Jr.

(57) ABSTRACT

A method, a Software-Defined Networking (SDN) controller, and a network include operation of a multi-layer SDN network and uniquely identifying streaming content on higher layers relative to the multi-layer SDN network through deep packet inspection; associating the streaming content to a multi-layer service on the SDN network; and monitoring the streaming content on the SDN network over the multi-layer service. This can include dynamically adjusting bandwidth of the multi-layer service utilizing OpenFlow on the SDN network based on the monitoring. The deep packet inspection can utilize a Bloom filter embedded in a resource identifier of the streaming content by the content provider, wherein the embedded Bloom filter is transparent to content players and does not require changes to storage on associated web servers for the streaming content.

16 Claims, 13 Drawing Sheets

(51) Int. Cl.
*H04L 12/911* (2013.01)
*H04L 12/26* (2006.01)
*H04L 29/06* (2006.01)
*H04L 12/801* (2013.01)

(58) Field of Classification Search
CPC . H04L 45/00; H04L 29/0653; H04L 49/3009; H04L 47/10
USPC ........................................................ 709/223
See application file for complete search history.

(56) References Cited

U.S. PATENT DOCUMENTS

| | | | | |
|---|---|---|---|---|
| 8,504,488 | B2* | 8/2013 | Dutta | G06Q 30/02 706/12 |
| 8,751,511 | B2* | 6/2014 | Dong | G06Q 10/06 707/749 |
| 9,038,151 | B1* | 5/2015 | Chua | H04L 45/42 709/223 |
| 2004/0181588 | A1* | 9/2004 | Wang | H04L 67/327 709/207 |
| 2008/0144177 | A1* | 6/2008 | Miller | G01J 3/02 359/489.07 |
| 2008/0271103 | A1* | 10/2008 | Praden | H04N 7/163 725/116 |
| 2008/0295140 | A1* | 11/2008 | Praden | H04N 7/17318 725/93 |
| 2011/0102157 | A1* | 5/2011 | Tarkoma | H04W 52/0229 340/10.33 |
| 2012/0158756 | A1* | 6/2012 | Jimenez | G06F 17/30949 707/754 |
| 2013/0071116 | A1 | 3/2013 | Ong | |
| 2013/0163426 | A1 | 6/2013 | Beliveau et al. | |
| 2013/0170344 | A1* | 7/2013 | Crowe | H04L 47/72 370/230 |
| 2013/0188957 | A1* | 7/2013 | Deng | H04B 10/506 398/79 |
| 2013/0223226 | A1 | 8/2013 | Narayanan et al. | |
| 2013/0223442 | A1 | 8/2013 | Narayanan et al. | |
| 2013/0250770 | A1* | 9/2013 | Zou | H04L 47/19 370/238 |
| 2013/0259465 | A1 | 10/2013 | Blair | |
| 2013/0272305 | A1 | 10/2013 | Lefebvre et al. | |
| 2013/0276092 | A1 | 10/2013 | Sun et al. | |
| 2014/0052836 | A1* | 2/2014 | Nguyen | H04L 45/38 709/223 |
| 2014/0092905 | A1* | 4/2014 | Hui | H04L 45/34 370/392 |
| 2014/0344468 | A1* | 11/2014 | Saremi | H04L 65/105 709/231 |
| 2014/0344575 | A1* | 11/2014 | Saremi | H04L 63/0428 713/168 |
| 2015/0012551 | A1* | 1/2015 | Dong | H04W 4/005 707/755 |
| 2015/0016255 | A1* | 1/2015 | Bisht | H04L 47/11 370/235 |
| 2015/0026794 | A1* | 1/2015 | Zuk | H04L 63/0227 726/13 |
| 2015/0039629 | A1* | 2/2015 | Theeten | G06F 17/30628 707/747 |
| 2015/0127805 | A1* | 5/2015 | Htay | H04L 43/0876 709/224 |

OTHER PUBLICATIONS

Georgopoulos et al., "Towards Network-wide QoE Fairness Using OpenFlow-assisted Adaptive Video Streaming," Future Human-Centric Multimedia Networking, ACM, Aug. 2013, pp. 15-20.

Jarschel et al., "SDN-Based Application-Aware Networking on the Example of YouTube Video Streaming," 2013 Second European Workshop on Software Defined Networks, IEEE, Oct. 2013, pp. 87-92.

Dharmapurikar S et al: "Deep packet inspection using parallel bloom filters", IEEE Micro, IEEE Service Center, Los Alamitos, CA, US, val. 24, No. 1, Jan. 1, 2004 (Jan. 1, 2004 ), pp. 52-61, XP0111 08460, ISSN: 0272-1732, DOI: 10.11 09/MM.2004. 1268997.

EPO Communication pursuant to Article 94(3) EPC, Jun. 13, 2017.

* cited by examiner

DYNAMIC BANDWIDTH ALLOCATION SYSTEMS AND METHODS USING CONTENT IDENTIFICATION IN A SOFTWARE-DEFINED NETWORKING CONTROLLED MULTI-LAYER NETWORK

FIELD OF THE DISCLOSURE

The present disclosure relates generally to networking systems and methods. More particularly, the present disclosure relates to Dynamic Bandwidth Allocation Systems and Methods using Content Identification in a Software-Defined Networking (SDN) Controlled Multi-Layer Network.

BACKGROUND OF THE DISCLOSURE

Conventional networks have little interaction between various layers. For example, Layers 0-2 (e.g., optical (DWDM) at Layer 0, Optical Transport Network (OTN) or SONET/SDH at Layer 1, Ethernet at Layer 2) have little interaction with higher layer traffic (e.g., Layers 4-7). In the context of content delivery in conventional networks at Layers 0-2, the present state-of-the art solutions aim at providing a best quality stream based on available bandwidth knowing nothing about the content and having no ability to create a different, higher bandwidth, service to carry the content if it determines the current service to be sub-optimal. Today's mechanisms to accomplish guaranteed bandwidth are subscription-based (with the content providers) and are accomplished with statically provisioned core networks (at Layers 0-1 and possibly 2) that lead to under-utilization since these maximum bandwidth scenarios are not in use 100% of the time. Here, Over-The-Top (OTT) content providers maintain their transparency through an Internet Service Provider's (ISP) network using this approach. In a session based approach, a particular session is identified by Layer 4-7 information. In this scenario, an initial session handshake between OTT server and a subscriber device through the portal path is required. This handshake identifies the unique flow identifier (e.g., Internet Protocol (IP) source address +IP destination address +Transmission Control Protocol (TCP) port number). The shortcoming of this approach is the manual step involvement of the portal. Note, both DWDM and OTN/SONET/SDH (TDM) are Layer 1 physical layer protocols in the OSI stack. However, those of ordinary skill in the art refer to DWDM as a separate Layer, i.e., Layer 0, to distinguish between DWDM and TDM protocols.

Today's mechanism to accomplish the "best" user experience in content viewing is to use adaptive bit rate streaming. This technique is used in streaming multimedia over one or more networks to user devices (e.g., computers, smart phones, tablets, etc.) with the aim at providing the best user experience (i.e., best video resolution for movies, etc.) which is based entirely on the availability of bandwidth and independent of the content. While in the past most video streaming technologies utilized streaming protocols such as Real Time Transport Protocol (RTP) with Real Time Streaming Protocol (RTSP), today's adaptive streaming technologies are almost exclusively based on Hypertext Transfer Protocol (HTTP) and are designed to work efficiently over large distributed HTTP networks such as the Internet.

In the subscriber (identified by destination IP address) based approach, customers who pay the highest monthly fee have their streams carried on pre-established high performance end-to-end tunnels. The shortcoming of this approach is the over-provisioning of the network (e.g., at Layers 0-1 and possibly 2). Furthermore, there is no ability to distinguish multiple streams from different OTT providers for this subscriber. In the session based approach, a particular session is identified by Layer 4-7 information. In this scenario, an initial session handshake between OTT server and subscriber device through the portal path is required. This handshake identifies the unique flow identifier (e.g. IP source address+IP destination address+TCP port number). The shortcoming of this approach is the manual step involvement of the portal. Further, the present state of art solution does not involve a multi-layer network and coordination therebetween. Lastly, another shortcoming is the inability of the network provider (e.g., ISP) to know what content is being passed through their network.

BRIEF SUMMARY OF THE DISCLOSURE

In various exemplary embodiments, dynamic bandwidth allocation systems and methods can use an SDN controller and associated applications to determine the streaming content by performing deep packet inspection (DPI) and further associating the content to a multi-layer service. The dynamic bandwidth allocation systems and methods can use a Bloom filter to allow the Deep Packet Inspection component to identify the packets that belong to the media stream and its segments in a completely transparent manner to the HTTP streaming content players without requiring any changes to storage structure on the web servers. Finally, the dynamic bandwidth allocation systems and methods can dynamically adjust bandwidth by provisioning/deprovisioning services spanning multi-layer (L0, L1 and L2) using the OpenFlow protocol based on the original content identified.

In an exemplary embodiment, a method includes operating a multi-layer Software-Defined Networking (SDN) network; uniquely identifying streaming content on higher layers relative to the multi-layer SDN network through deep packet inspection; associating the streaming content to a multi-layer service on the SDN network; and monitoring the streaming content on the SDN network over the multi-layer service. The method can further include dynamically adjusting bandwidth of the multi-layer service utilizing OpenFlow on the SDN network based on the monitoring. The multi-layer SDN network can operate at any of Layers 0, 1, and 2, Layer 0 being wavelengths, Layer 1 being Time Division Multiplexing, and Layer 2 being packets. The streaming content can include Hypertext Transfer Protocol (HTTP) adaptive streaming. The uniquely identifying, the associating, and the monitoring can be performed by an SDN controller. The method can further include performing the deep packet inspection utilizing a Bloom filter embedded in a resource identifier of the streaming content, wherein the embedded Bloom filter is transparent to content players and does not require changes to storage on associated web servers for the streaming content. The method can further include receiving the streaming content from a content provider with an embedded Bloom Filter in a resource identifier; and tracking the streaming content associated with the content provider over the SDN network.

The method can further include prior to the uniquely identifying and at a content provider, initializing a master N-bit Bloom filter with k different hash function associated with the Bloom filter; and repeating each of the following steps for each media segment comprising segment data produced by the content provider: initializing an M-bit empty Bloom Filter with L different hash functions associated with the filter; as each segment is produced, taking a first set of bytes of the segment data and performing an M-bit Bloom filter addition by feeding the segment data through each of the L hash function and setting the corresponding Bloom filter bits; performing master N-bit Bloom filter addition by feeding the data through each of the K hash function and setting the corresponding Bloom filter bits; and creating a Uniform Resource Indicator (URI) for every media segment that enables its clients to obtain the segment data. The method can further include embedding the Bloom Filter in the URI of every media segment file for the uniquely identifying.

In another exemplary embodiment, a Software-Defined Networking (SDN) controller includes a network interface communicatively coupled to one or more network devices in a multi-layer Software-Defined Networking (SDN) network; a processor communicatively coupled to the network interface; memory storing instructions that, when executed, cause the processor to: uniquely identify streaming content on higher layers relative to the multi-layer SDN network through deep packet inspection; associate the streaming content to a multi-layer service on the SDN network; and monitor the streaming content on the SDN network over the multi-layer service. The instructions, when executed, can further cause the processor to: dynamically adjust bandwidth of the multi-layer service utilizing OpenFlow on the SDN network based on the monitoring. The multi-layer SDN network can operate at any of Layers 0, 1, and 2, Layer 0 being wavelengths, Layer 1 being Time Division Multiplexing, and Layer 2 being packets. The streaming content can include Hypertext Transfer Protocol (HTTP) adaptive streaming. The instructions, when executed, can further cause the processor to: perform the deep packet inspection utilizing a Bloom filter embedded in a resource identifier of the streaming content, wherein the embedded Bloom filter is transparent to content players and does not require changes to storage on associated web servers for the streaming content. The instructions, when executed, can further cause the processor to: receive the streaming content from a content provider with an embedded Bloom Filter in a resource identifier; and track the streaming content associated with the content provider over the SDN network.

In yet another exemplary embodiment, a network includes a multi-layer Software-Defined Networking (SDN) network; a content provider comprising at least one web server communicatively coupled to the SDN network; an SDN controller communicatively coupled to the SDN network and configured to: uniquely identify streaming content from the content provider on higher layers relative to the multi-layer SDN network through deep packet inspection; associate the streaming content to a multi-layer service on the SDN network; monitor the streaming content on the SDN network over the multi-layer service; and dynamically adjust bandwidth of the multi-layer service utilizing OpenFlow on the SDN network based on the monitoring. The multi-layer SDN network can operate at any of Layers 0, 1, and 2, Layer 0 being wavelengths, Layer 1 being Time Division Multiplexing, and Layer 2 being packets, and wherein the streaming content can include Hypertext Transfer Protocol (HTTP) adaptive streaming.

The SDN controller can be configured to: perform the deep packet inspection utilizing a Bloom filter embedded in a resource identifier of the streaming content by the content provider, wherein the embedded Bloom filter is transparent to content players and does not require changes to storage on associated web servers for the streaming content. The content provider can include a server configured to: prior to the uniquely identifying, initialize a master N-bit Bloom filter with k different hash function associated with the Bloom filter; and repeat each of the following steps for each media segment comprising segment data produced by the content provider: initialize an M-bit empty Bloom Filter with L different hash functions associated with the filter; as each segment is produced, take a first set of bytes of the segment data and performing an M-bit Bloom filter addition by feeding the segment data through each of the L hash function and setting the corresponding Bloom filter bits; perform master N-bit Bloom filter addition by feeding the data through each of the K hash function and setting the corresponding Bloom filter bits; and create a Uniform Resource Indicator (URI) for every media segment that enables its clients to obtain the segment data.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, dynamic bandwidth allocation systems and methods using content identification in a Software-Defined Networking (SDN) controlled multi-layer network are described. The dynamic bandwidth allocation systems and methods relate to an SDN network, a controller adaption layer, controller, an adaptive streaming server and methods to determine a provider, and furthermore, specific content, and a method to dynamically control the bandwidth across a multi-layer network for the delivery of the said original content to one or more user devices. Fundamentally, the dynamic bandwidth allocation systems and methods provide a multi-layer SDN solution. The SDN Controller, with the corresponding adaption layer and applications, can provision services spanning multi-layer (Layers 0-2 (L0/L1/L2)) such as, for example, using the OpenFlow protocol. To accomplish the multi-layer SDN control, the dynamic bandwidth allocation systems and methods describe techniques of identifying content flowing through the network for the purpose of dynamically controlling the service bandwidth.

Figure 1:
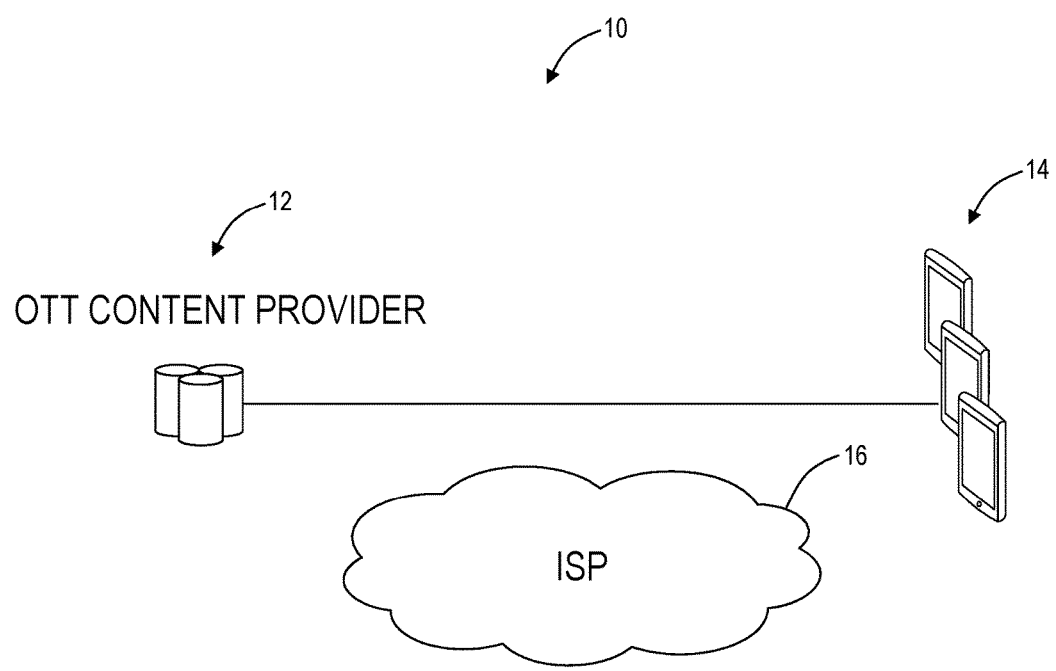
FIG. 1 is a network diagram of a network with an OTT content provider providing streaming content to one or more end users via an ISP network.

Referring to FIG. 1, in an exemplary embodiment, a network diagram illustrates a network 10 with an OTT content provider 12 providing streaming content to one or more end users 14 via an ISP network 16. In various exemplary embodiments described herein, the OTT content provider 12 and the ISP network 16 are used for illustration purposes to describe the dynamic bandwidth allocation systems and methods. The dynamic bandwidth allocation systems and methods contemplate operation on any type of networks to enable interaction between higher layers (e.g., HTTP) and lower layers (e.g., L0/L1/L2). Such interaction is especially advantageous when the lower layers utilize SDN. The ISP network 16 operates a Layers 0-3 (L0/L1/L2/L3) whereas the OTT content provider 12 is providing content at higher layers, e.g. Layer 7 with HTTP streaming or the like. In various exemplary embodiments, the dynamic bandwidth allocation systems and methods include the OTT content provider 12 including a unique identifier at the HTTP layer or the like that in turn can be monitored by the ISP network 16 to uniquely identify content over the ISP network 16.

It is an objective of the dynamic bandwidth allocation systems and methods to enable direct interaction between the ISP network 16 and the OTT content provider 12. With the dynamic bandwidth allocation systems and methods, the ISP network 16 is no longer in the dark as to the content which is being transported and having a history of what content was transported over time provides the ISP with many new business opportunities. A significant benefit of the dynamic bandwidth allocation systems and methods is an ability to identify content at the highest granularity possible; every piece of content is unique, and utilizing this information to dynamically manage the path this content takes so that sufficient bandwidth is available for the end user to view it in its maximum resolution. Being able to dynamically allocate bandwidth based on original content opens many business opportunities for network operators of the ISP network 16. For example, network operators can allow its customers to purchase packages where they are guaranteed full high-quality video streaming from a list of OTT content providers (e.g., Netflix, Hulu, Amazon, Apple, etc.), specific sporting events such as World Cup soccer, real-time gaming, and hard to find television channels from around the world.

The network operators can also dynamically adjust the subscriber's contracted subscription rate if they are streaming any of the above content. In addition to these benefits, network operators can utilize the dynamic bandwidth allocation systems and methods to create a history of the content streamed across the ISP network 16. With this information, more informed and targeted marketing and pricing contracts with the content providers can be negotiated. In context with the above, it is anticipated that service delivery of multimedia content will continue to move away from coaxial cable (for MSO providers) and satellite towards packet-based delivery and the dynamic bandwidth allocation systems and methods anticipate providing powerful tools for network operators to differentiate such service offerings.

Figure 2:
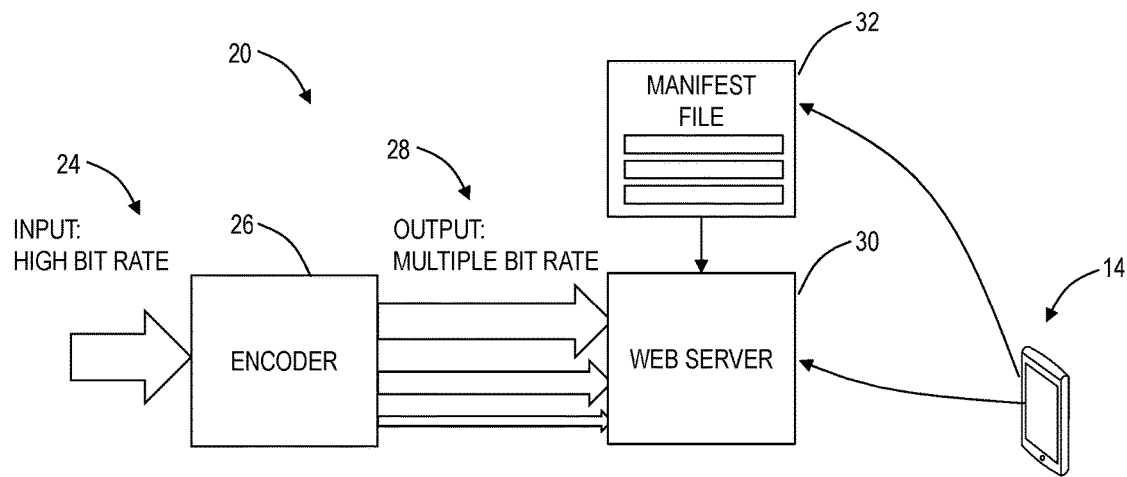
FIG. 2 is a network diagram of HTTP adaptive streaming.
Figure 3:
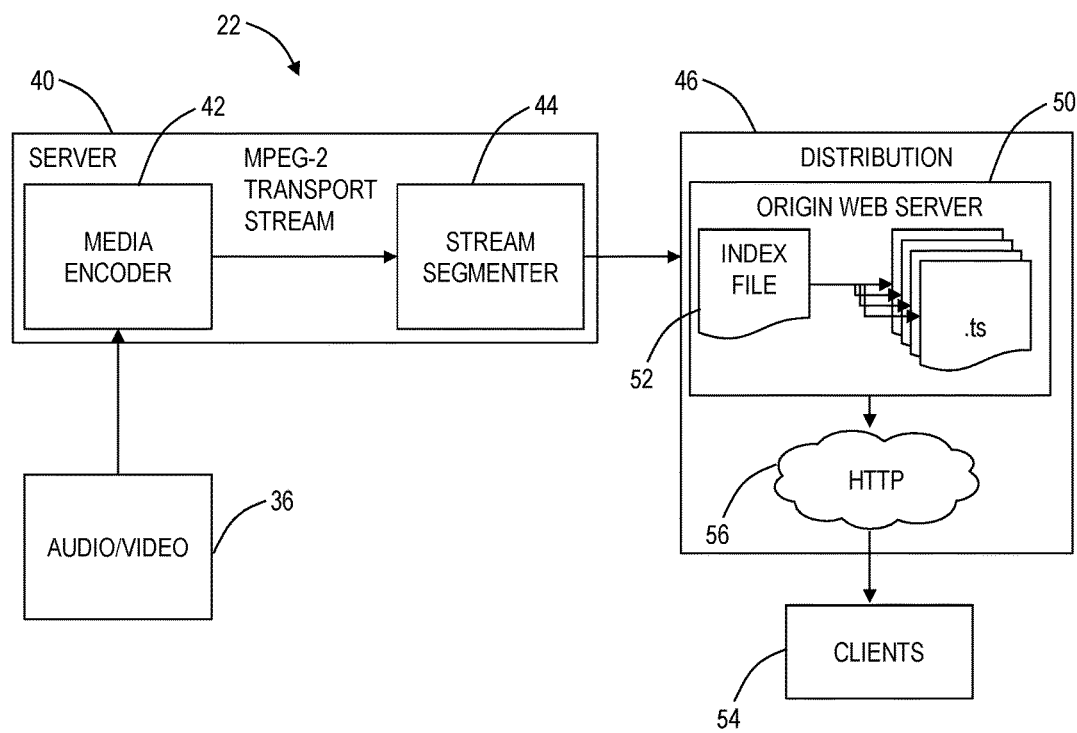
FIG. 3 is a network diagram of HTTP live streaming (HLS)

Referring to FIGS. 2 and 3, in an exemplary embodiment, network diagrams illustrate HTTP adaptive streaming 20 and HTTP live streaming (HLS) 22. Each of the streaming 20, 22 can be used by the OTT content provider 12 over the ISP network 16. The HTTP adaptive streaming 20 includes source content at an input 24 at a high bit rate that is encoded by an encoder 26 at multiple bit rates 28. Each of the multiple bit rates 28 are segmented into small multi-second parts and provided by a web server 30. The streaming client (i.e., the end user 14) is made aware of the available streams at different bit rates, and segments of the streams by a manifest file 32. The segment size can vary but are typically between two (2) and ten (10) seconds.

The HTTP Live Streaming 22 sends audio and video as a series of small files, typically of about 10 seconds duration, called media segment files. Specifically, the HTTP Live Streaming 22 includes audio/video 36 provided to a server 40 including a media encoder 42 providing an MPEG-2 transport stream to a stream segmenter 44. Distribution 46 is performed by a web server 50 which uses an index file 52, or playlist, that gives clients 54 the Uniform Resource Locators (URLs) of the media segment files over HTTP 56. The playlist can be periodically refreshed to accommodate live broadcasts, where media segment files are constantly being produced. The HTTP Live Streaming 22 steams can be identified by the master playlist (manifest) URL format extension of .M3U8. For example, Apple has submitted its solution to IETF (tools.ietf.org/html/draft-pantos-http-live-streaming-11), the contents of which are incorporated by reference herein. An .M3U8 file is an extensible playlist file format. It is an M3U playlist containing UTF-8 encoded text. The m3u file format is a de facto standard playlist format suitable for carrying lists of media file URLs. This is the format used as the index file for the HTTP Live Streaming 22.

A master index file may reference alternate streams of content. References can be used to support delivery of multiple streams of the same content with varying quality levels for different bandwidths or devices. The HTTP Live Streaming 22 supports switching between streams dynamically if the available bandwidth changes. The client software uses heuristics to determine appropriate times to switch between the alternates. Currently, these heuristics are based on recent trends in measured network throughput. The master index file points to alternate streams of media by including a specially tagged list of other index files. A .ts file contains an MPEG-2 Transport Stream. This is a file format that encapsulates a series of encoded media samples—typically audio and video. The file format supports a variety of compression formats, including MP3 audio, AAC audio, H.264 video, and so on.

Thus, in both the HTTP adaptive streaming 20 and the HTTP live streaming (HLS) 22, the OTT content provider 12 has the adaptive streaming encoder/transcoder (i.e., the encoder 26 and the encoder 42) and an adaptive streaming server (i.e., the web server 30, 50). The web server 30, 50 is communicatively coupled to the end users 14 and the ISP network 12 (and possibly via other networks such as access and/or wireless networks). The media encoder 26, 42 receives the source video/audio and generates multiple files of the same video/audio content but which are encoded at different bit rates. For example, the adaptive streaming encoder 26, 42 can output a 128K bit rate file, a 256K bit rate file, a 768K bit rate file and a 65K bit rate audio only file. The segmentation unit then segments each of the different bit rate file into multiple segment files. That is the 128K bit rate file is segmented into multiple files, each contains video/audio packets for predetermined time duration (typically 10 seconds). These files are stored in the database. The adaptive streaming server interfaces with the database and creates a master manifest file which includes child manifest files. Each child manifest file includes references to each of the segment files.

For example, an exemplary manifest file could include:

```
#EXTM3U
#EXT-X-STREAM-INF:PROGRAM-ID=1,BANDWIDTH=1280000
    http://example.com/low.m3u8
#EXT-X-STREAM-INF:PROGRAM-ID=1,BANDWIDTH=2560000
    http://example.com/mid.m3u8
#EXT-X-STREAM-INF:PROGRAM-ID=1,BANDWIDTH=7680000
    http://example.com/hi.m3u8
#EXT-X-STREAM-
#INF:PROGRAMID=1,BANDWIDTH=65000,CODECS="mp4a.40.5"
    http://example.com/audio-only.m3u8
```

For example, an exemplary child manifest could include:

```
                #EXT-X-VERSION:3
                #EXTM3U
                #EXT-X-TARGETDURATION:10
                #EXT-X-MEDIA-SEQUENCE:1
                #EXTINF:10.0,
                http://example.com/segment0.ts
                #EXTINF:10.0,
                http://example.com/segment1.ts
                #EXTINF:9.5,
                http://example.com/sigment2.ts
                #EXT-X-ENDLIST
```

Figure 4:
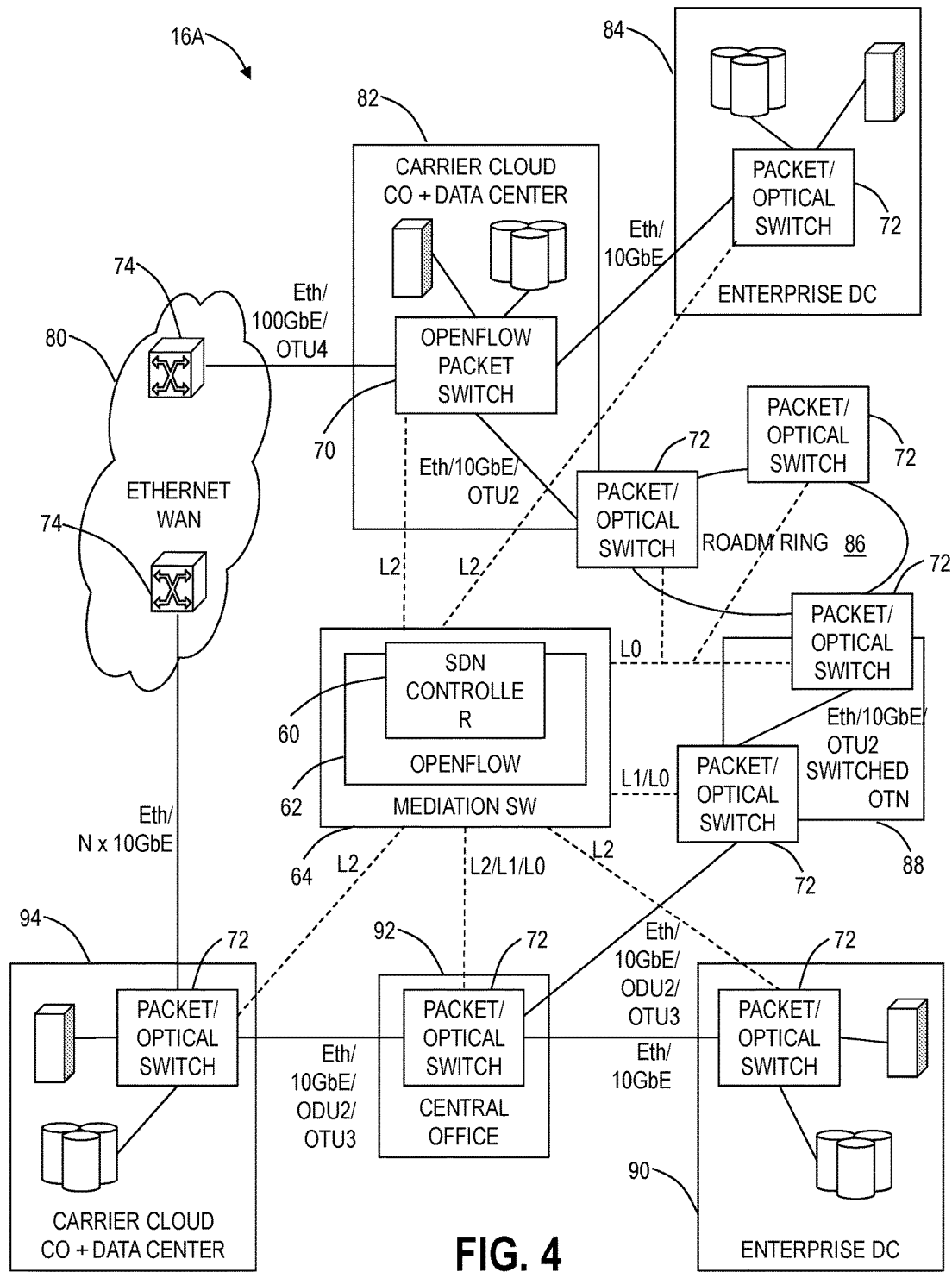
FIG. 4 is a network diagram of an exemplary SDN ISP network.

Referring to FIG. 4, in an exemplary embodiment, a network diagram illustrates an exemplary SDN ISP network 16A. The ISP network 16A is shown for illustration purposes to describe SDN functionality at Layers 0, 1, and 2. Those of ordinary skill in the art will recognize that any SDN network configuration at Layers 0, 1, and 2 is contemplated. The ISP network 16A is a SDN network which includes an SDN controller 60 with the ability to centrally program provisioning of forwarding in the network in order for more flexible and precise control over network resources to support new services. OpenFlow (www.openflow.org) is an implementation of this which requires a special OpenFlow interface 62 from the SDN controller 60, via mediation software 64, to each switch 70, 72, 74 in the network 16A in order to provision the forwarding table at each switch along a connection path in order to instantiate the forwarding behavior needed for the connection. OpenFlow is described, for example, in the OpenFlow Switch Speciation, Version 1.1.0 (February 2011)—Version 1.3.0 (June 2012), the contents of which are incorporated by reference herein. Other SDN protocols besides OpenFlow are also contemplated with the systems and methods described herein.

Again, for illustration purposes, the ISP network 16A includes an OpenFlow packet switch 70, various packet/optical switches 72, and packet switches 74 with the switches 70, 72 each communicatively coupled to the SDN controller 60 via the OpenFlow interface 62 and the mediation software 64 at any of Layers 0-2 (L0 being DWDM, L1 being OTN, and L2 being Ethernet). The switches 70, 72, 74, again for illustration purposes only, are located at various sites including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. Again, the network 16A is shown just to provide context and typical configurations at Layers 0-2 in an SDN network for illustration purposes.

Figure 14:
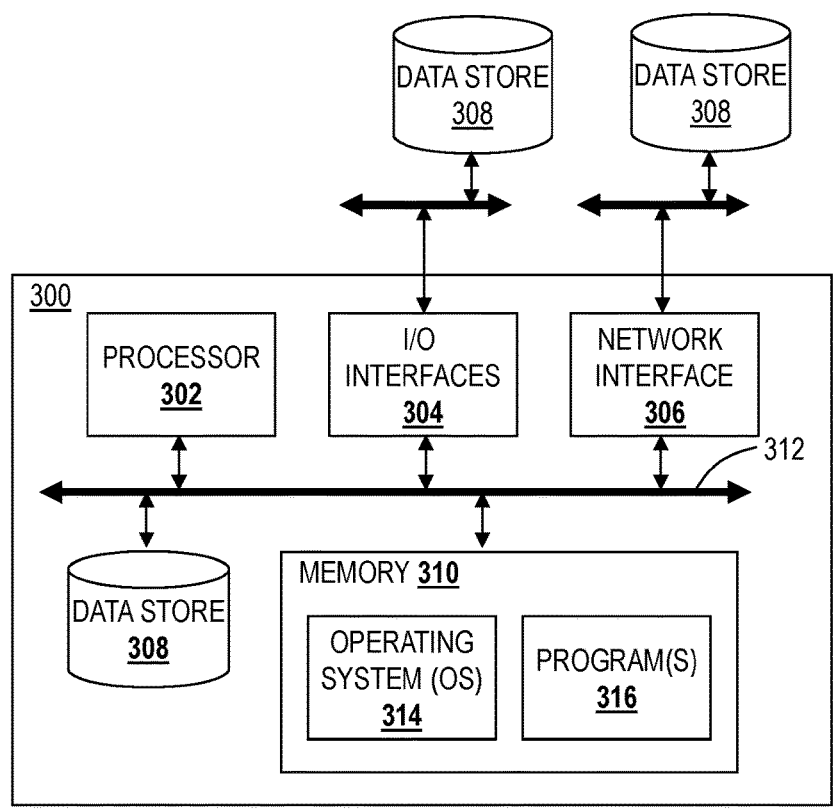
FIG. 14 is a block diagram of a server which may be used for the web servers, the server, the SDN controller, etc.

The switches 70, 72, 74 can operate, via SDN, at Layers 0-2. The OpenFlow packet switch 70, for example, can be a large-scale Layer 2 Ethernet switch that operates, via the SDN controller 60, at Layer 2 (L2). The packet/optical switches 72 can operate at any of Layers 0-2 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., and at Layer 2, the packet/optical switches 72 can provide Ethernet packet switching. An exemplary configuration of the packet/optical switches 72 and the OpenFlow packet switch 70 is illustrated in FIG. 14. The packet switches 74 can be traditional Ethernet switches that are not controlled by the SDN controller 60.

Figure 5:
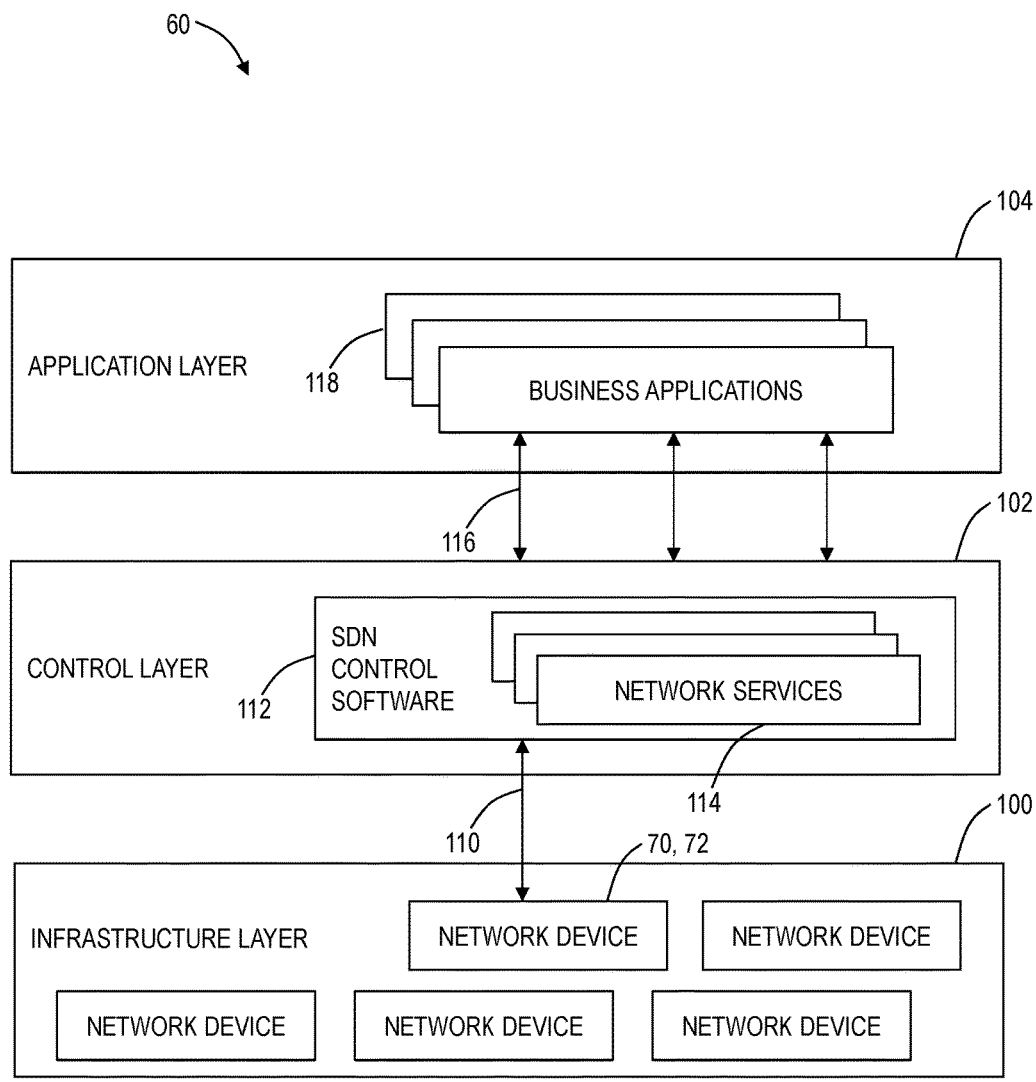
FIG. 5 is a block diagram illustrates functional components of the SDN controller in the exemplary SDN ISP network of FIG. 4.
Figure 13:
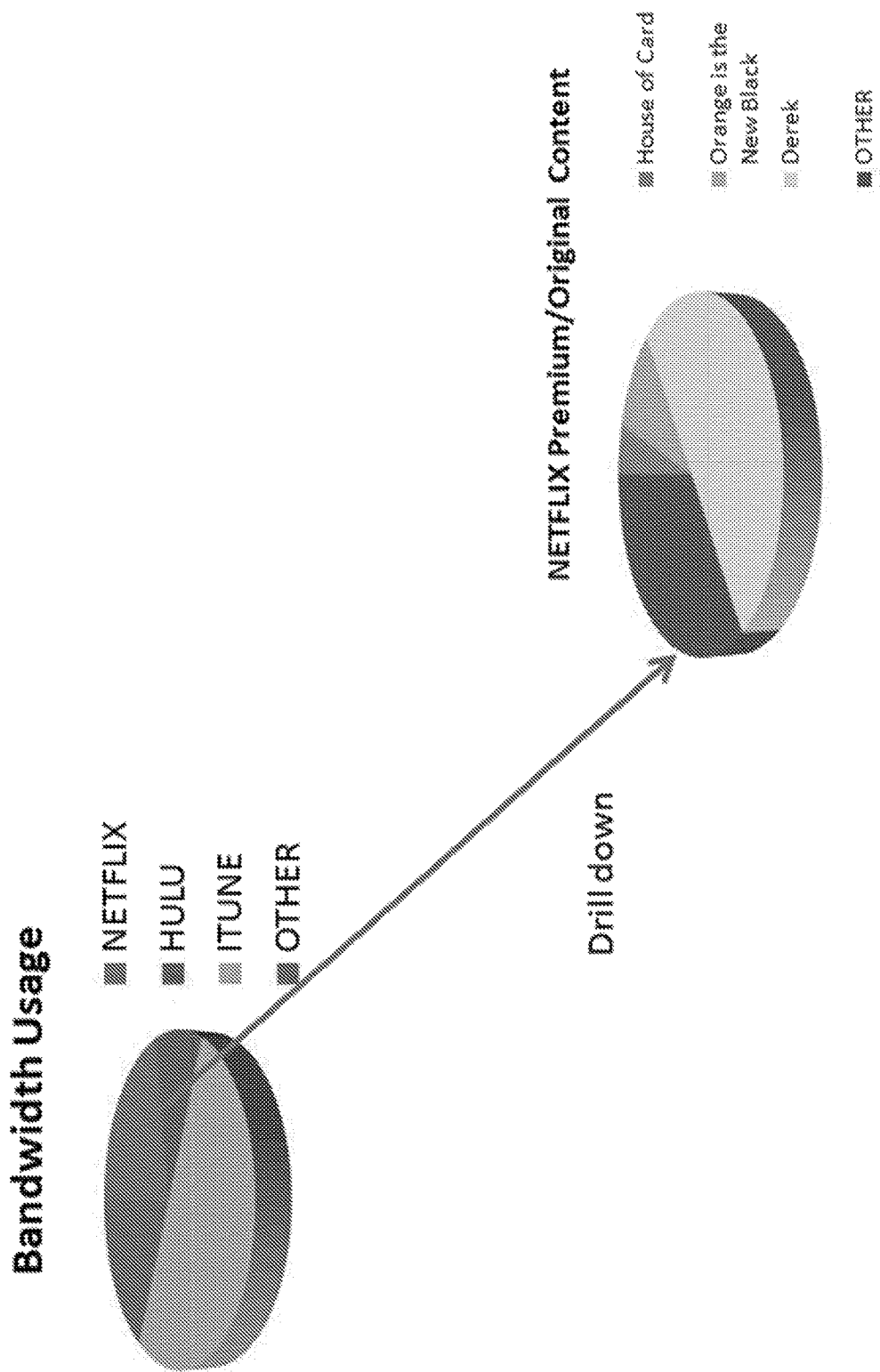
FIG. 13 is a graphical interface of the insight from FIG. 12 with a drill-down to identify specific premium/original content.

Referring to FIG. 5, in an exemplary embodiment, a block diagram illustrates functional components of the SDN controller 60. The SDN controller 60 can be a server or the like such as illustrated in FIG. 13 and the functional components can be implemented in software executed on the server. The SDN controller 60 includes an infrastructure layer 100, a control layer 102, and an application layer 104. The infrastructure layer 100 is communicatively coupled to network devices such as the switches 70, 72 via a control plane interface 110 such as OpenFlow. The infrastructure layer 100 allows communication between the SDN controller 60 and the network devices. The control layer 102 includes SDN control software 112 with a plurality of network services 114. The control layer 102 provides SDN functionality to manage network services through abstraction of lower level functionality. The application layer 104 communicates to the control layer 102 through various Application Programming Interfaces (APIs) 116. The application layer 104 provides end user connectivity to the SDN such as software modules and/or functions responsible for creating desired path and flow connections on the physical network through various business applications 118.

In the dynamic bandwidth allocation systems and methods, the OTT content provider 12 has HTTP streaming traffic over the ISP network 16A, i.e. via the switches 70, 72, 74. In conjunction with the SDN controller 60 and the web server 30, 50, the dynamic bandwidth allocation systems and methods include techniques for the web server 30, 50 to uniquely identify HTTP streaming traffic such that the SDN controller 60 and the switches 70, 72, 74 can, via deep packet inspection, determine content flows and adjust SDN bandwidth accordingly if needed. That is, the dynamic bandwidth allocation systems and methods contemplate operation with any type of adaptive HTTP streaming technology such as HTTP Live Streaming and the like to enable the SDN controller 60 to have knowledge of content at higher layers (e.g., Layers 4-7) for a variety of applications. The dynamic bandwidth allocation systems and methods contemplate the web server 30, 50 dynamically identifying the HTTP streams and the SDN controller 60 and the switches 70, 72 identifying the HTTP streams based thereon.

Figure 6:
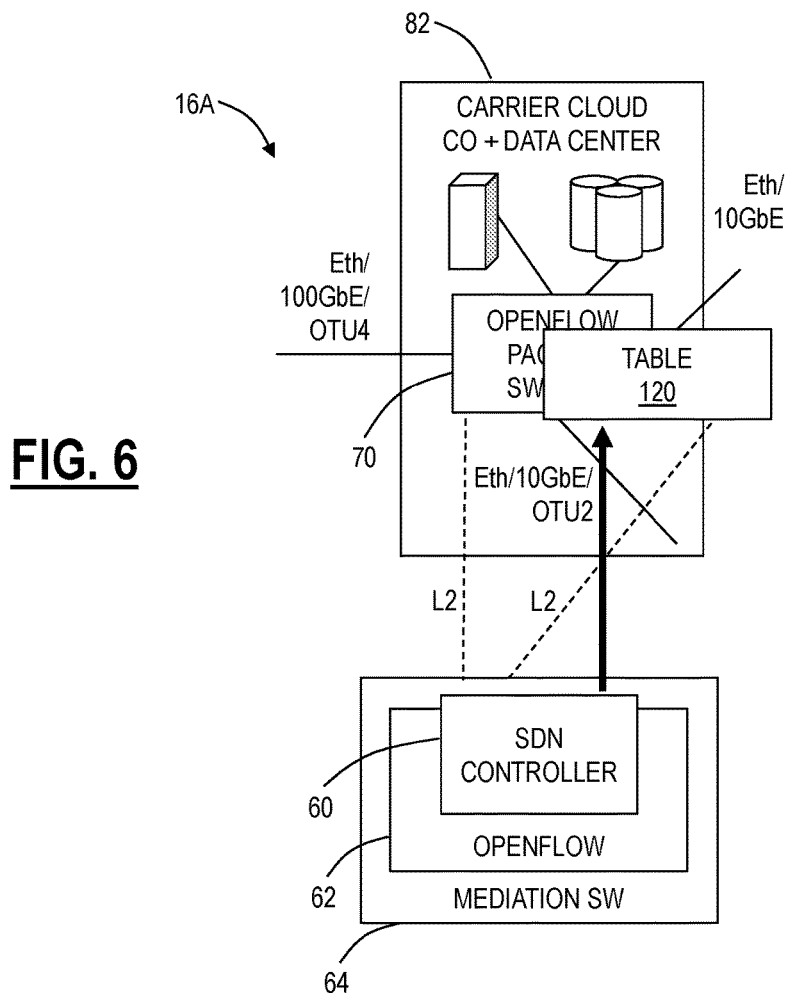
FIG. 6 is a network diagram of a portion of the SDN ISP network of FIG. 4 illustrating the OpenFlow packet switch and the SDN controller.

Referring to FIG. 6, in an exemplary embodiment, a portion of the SDN ISP network 16A is illustrated between the OpenFlow packet switch 70 and the SDN controller 60. Again, the SDN Controller 60 natively manages the OpenFlow packet switch 70. The controller adds a flow entry in an OpenFlow switch flow table to forward a copy of an incoming packet to the controller matching TCP source or destination port, which has the default value of 80. For example, the OpenFlow switch flow table could include a table 120 as follows which is provided from the SDN controller 60 to the OpenFlow packet switch 70:

| MAC src | MAC dst | IP src | IP dst | TCP sport | TCP dport | Action |
|---|---|---|---|---|---|---|
| * | * | * | * | 80 | * | Controller, Next Table |
| * | * | * | * | * | 80 | Controller, Next Table |

When a packet matches the flow entry, the OpenFlow Packet Switch 70 forwards a copy to the SDN Controller 60, which then passes it to the application layer 104 described below. The application layer 104 can include the business applications 118 including a deep packet inspection (DPI) application, a multi-layer service provisioning application, a multi-layer service inventory application, a multi-layer service insight application, a dynamic bandwidth allocation application, and the like. The DPI application is utilized to identify HTTP streams. The multi-layer service provisioning application is utilized to provision services at Layers 0-2 in the network 16A. The multi-layer service inventory application is utilized to monitor an HTTP stream, and the multi-layer service insight application with conjunction with the dynamic bandwidth allocation application can be utilized to move an HTTP stream for various reasons in the network 16A.

Figure 7:
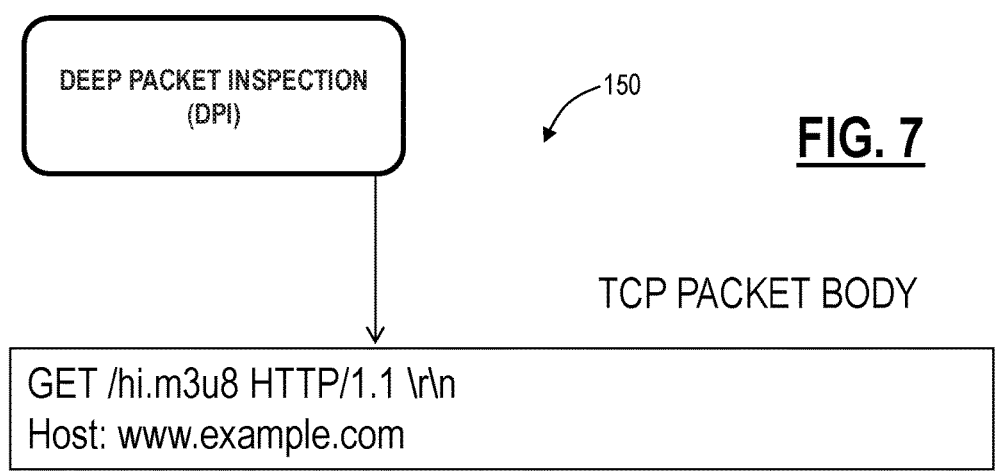
FIG. 7 is a block diagram of functional components of a deep packet inspection (DPI) application on the SDN controller.

Referring to FIG. 7, in an exemplary embodiment, a block diagram illustrates functional components of a deep packet inspection (DPI) application 150 on the SDN controller 60. The DPI application 150 is configured to identify HTTP streams, such as HTTP Live Streaming as shown in FIG. 7 by analyzing a Transmission Control Protocol (TCP) packet body to determine ah HLS stream from www.example.com. Once identified, the network 16A can continue to have visibility of the streaming content (i.e., HTTP streams) as described herein and various interactions through the multi-layer service provisioning application, the multi-layer service inventory application, the multi-layer service insight application, the dynamic bandwidth allocation application, and the like.

Figure 8:
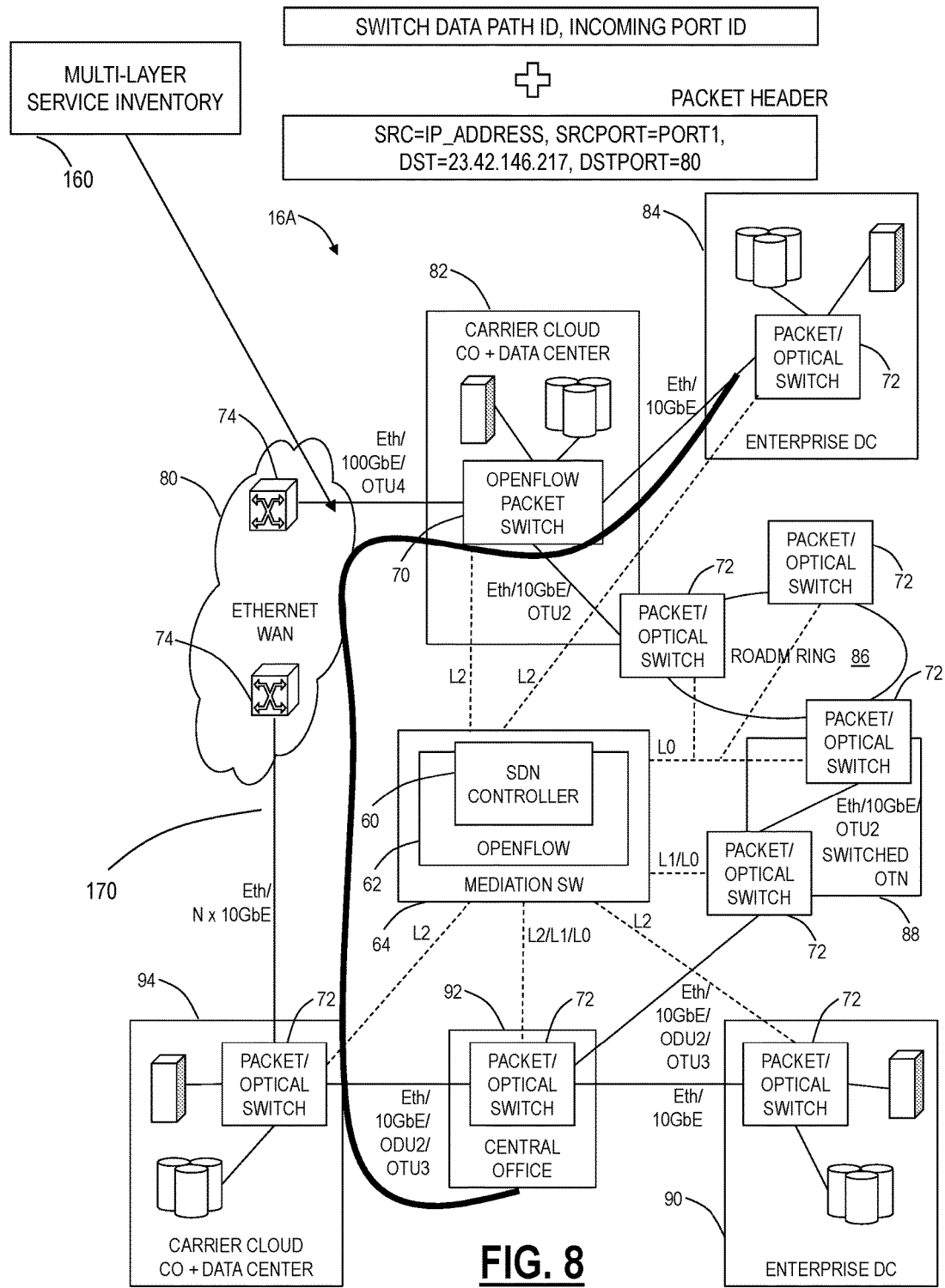
FIG. 8 is a network diagram of the SDN ISP network of FIG. 4 illustrating a multi-layer service inventory application on the SDN controller.

Referring to FIG. 8, in an exemplary embodiment, a network diagram illustrates the SDN ISP network 16A illustrating a multi-layer service inventory application 160 on the SDN controller 60. Once the streaming content is identified as a stream 170, the multi-layer service inventory application 160 provides the details of the service involved such as the switch path data identifier, the incoming port identifier, the source IP address, the source port, the destination address, the destination port, and the like.

Figure 9:
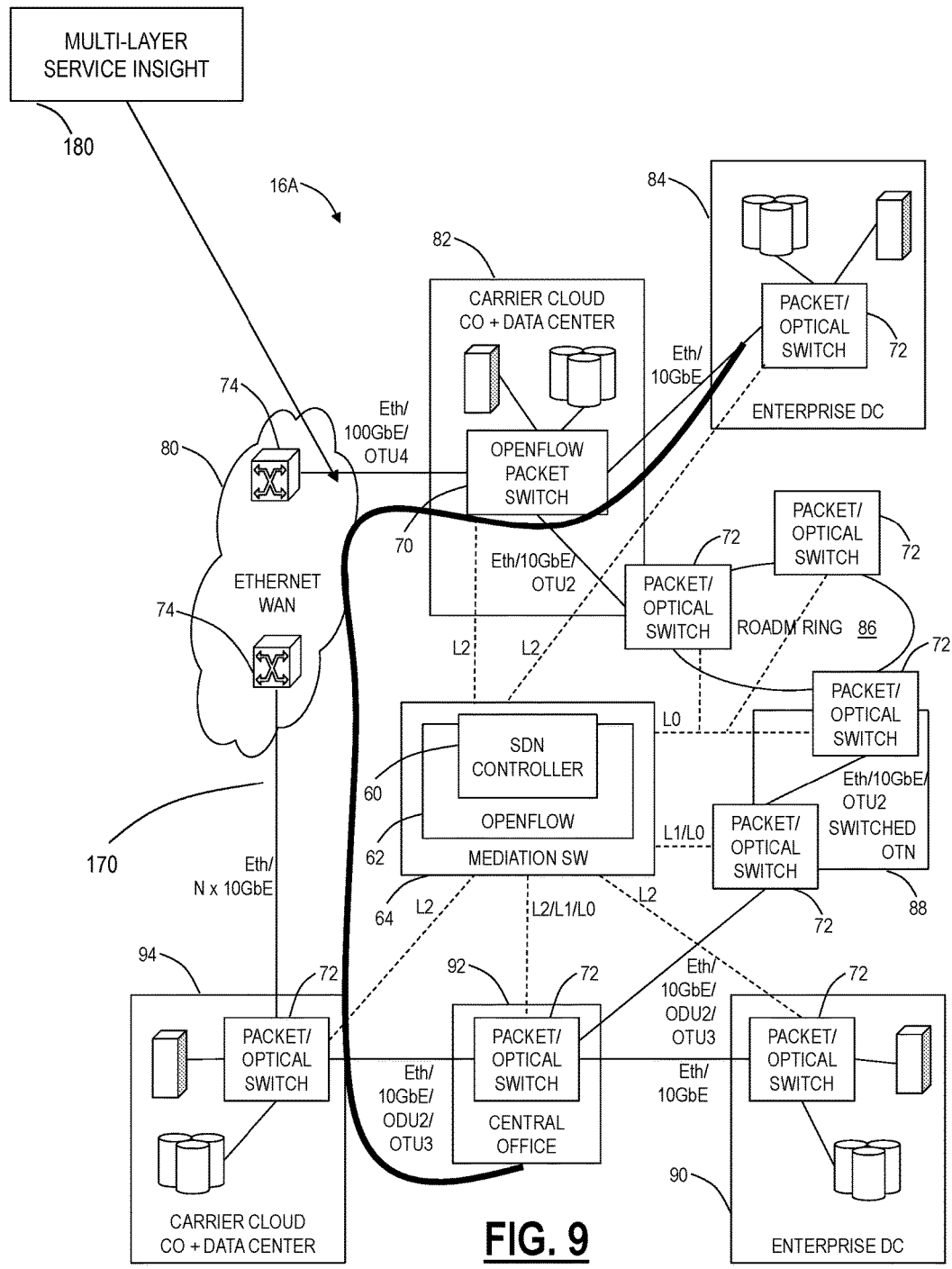
FIGS. 9-10 are network diagrams of the SDN ISP network of FIG. 4 illustrating a multi-layer service insight application and a dynamic bandwidth allocation application on the SDN controller.
Figure 10:
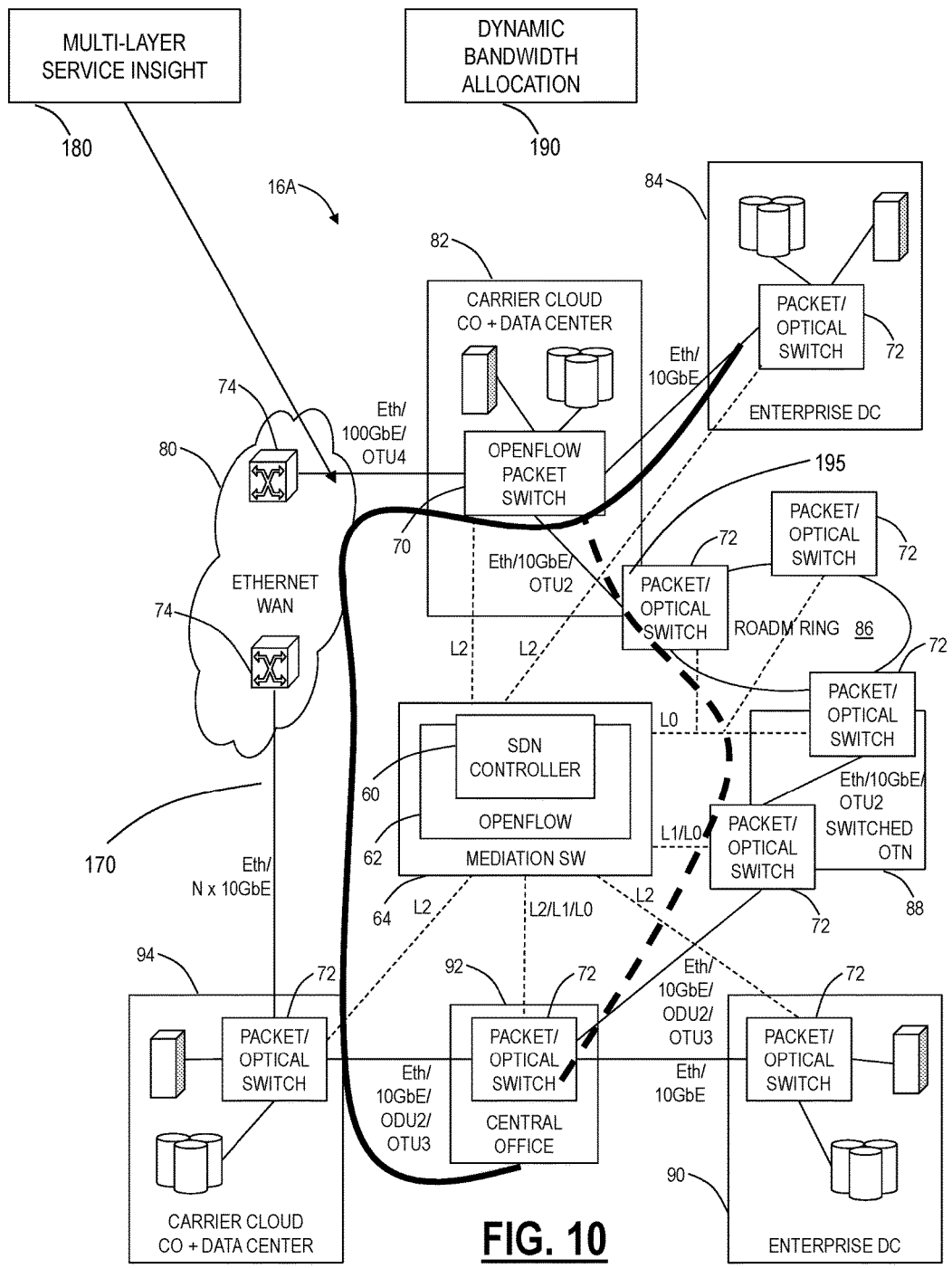

Referring to FIGS. 9-10, in an exemplary embodiment, a network diagram illustrates the SDN ISP network 16A illustrating a multi-layer service insight application 180 and a dynamic bandwidth allocation application 190 on the SDN controller 60. Once the stream 170 is identified with the DPI application 150 and the multi-layer service inventory application 160, the multi-layer service insight application 180 can monitor the stream 170 in the network 16A (FIG. 9). The multi-layer service inventory application 160 can identify an alternate path 195 that may be suitable for premium content with a suitable, well-defined Service Level Agreement (SLA). In the example of FIG. 10, the dynamic bandwidth allocation application 190 can provision a layer 0 wavelength on the ROADM ring 86, a layer 1 path through the Switched OTN node 88 to the Central Office, and any required layer 2 flows at each Enterprise DC 84, 90. Once provisioned, the content will flow across the path 195 allowing the customer to experience high quality video consumption which was not always possible using previous techniques.

Figure 11:
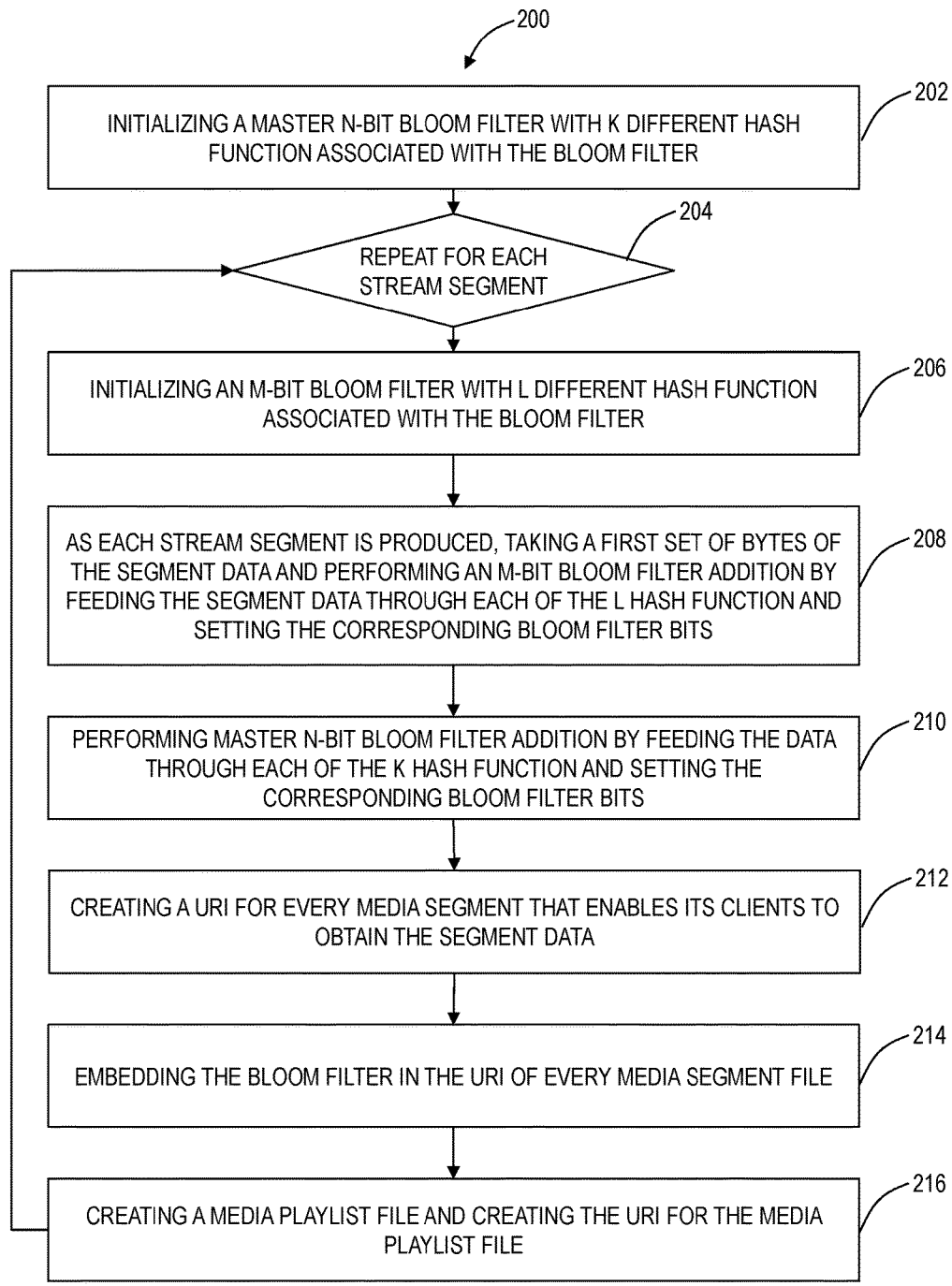
FIG. 11 is a flowchart of a method for dynamic bandwidth identification from the OTT content provider.

Referring to FIG. 11, in an exemplary embodiment, a flowchart illustrates a method 200 for dynamic bandwidth identification from the OTT content provider 12. The method 200 is illustrated with respect to HTTP Live Streaming (HLS), but the method 200 is equally applicable to other streaming techniques. The method 200 is implemented at the server 40 that encodes/segments the streams. Specifically, the server 40 is an HTTP adaptive streaming server (segmentation component) that divides the media stream into individual media segments. The method 200 proposes using a Bloom filter for quick, efficient identification. A Bloom filter is a space-efficient probabilistic data structure that is used to test whether an element is a member of a set. False positive matches are possible, but false negatives are not.

The method 200 includes initializing a master N-bit Bloom filter with k different hash function associated with the Bloom filter (step 202). For example, the N-bit Bloom filter could be 160 bits. The method 200 repeats each of the following steps for each media segment produced (step 204). The method 200 includes initializing an M-bit empty Bloom Filter with L different hash functions associated with the Bloom filter (step 206). For example, the M-bit Bloom filter could be 80 bits. The method 200 includes, as each segment is produced, taking a first set of bytes of the segment data and performing an M-bit Bloom filter addition by feeding the segment data through each of the L hash function and setting the corresponding Bloom filter bits (step 208). For example, the first set of bytes could be 512 bytes.

The method 200 includes performing master N-bit Bloom filter addition by feeding the data through each of the K hash function and setting the corresponding Bloom filter bits (step 210). The method includes creating a Uniform Resource Indicator (URI) for every media segment that enables its clients to obtain the segment data (step 212) and embedding the Bloom Filter in the URI of every media segment file (step 214). For example, this could be as follows:
example.com/c35d6c0804b1fc1b742e/segment0.ts
where example.com is the domain, segment0.ts is a media segment file, and c35d6c0804b1fc1b742e is the Bloom Filter.

The method 200 includes creating a Media Playlist file and creating the URI for the Media Playlist file (step 216). The Playlist file contains each media segment URI with its embedded Bloom Filter. For example, the Playlist file could include:

```
#EXT-X-VERSION:3
#EXTM3U
#EXT-X-TARGETDURATION:10
#EXT-X-MEDIA-SEQUENCE:1
#EXTINF:10.0,
```

-continued

```
http://example.com/c35d6c0804b1fc1b742e/segment0.ts
#EXTINF:10.0,
http://example.com/228337bc953de48f94a0/segment1.ts
#EXTINF:9.5,
http://example.com/fc5ce2ab52a9c3a45181/sigment2.ts
#EXT-X-ENDLIST
```

The method 200 also creates the URI for the Media Playlist file, embedding the master N-bit Bloom Filter and this could include:
example.com/
   f1d515ea8a76a81f6f458cc05ea799d59f45bbb4/
   low.m3u8

Advantageously, this novel use of a Bloom Filter in URI is completely transparent to HTTP streaming client players, thereby working over existing infrastructure. Another novel use is that there are no changes to storage structure on the web servers 30, 50. On the web servers 30, 50 hosting the media segments, URL rewriting can be used to hide the Bloom Filter from the URL. Here is an example for Tomcat using mod_headers:

```
# Remove second to last path component
Header edit Location ^([^/]*//[^/]*)?/(.*)/(.*)$ $1/$3
```

Figure 12:
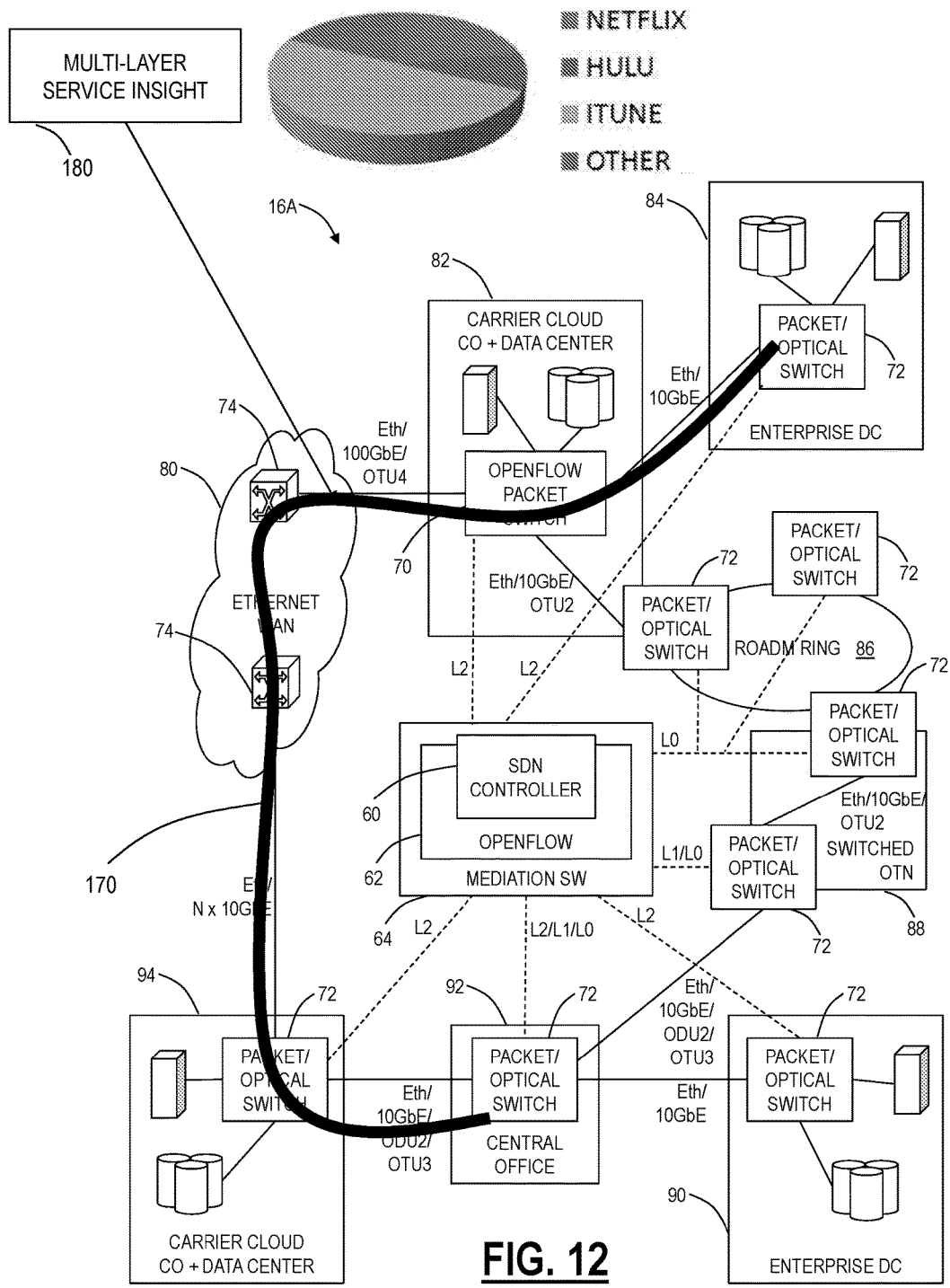
FIG. 12 is a network diagram illustrating the multi-layer service insight application providing insight into OTT Content providers.

The Bloom Filter information provided by the method 200 allows the deep packet inspection (DPI) application 150 to identify the packets that belong to the media stream and its segments, at Layer 7. The multi-layer service insight application 180 can track the media streams flowing through services. Referring to FIG. 12, in an exemplary embodiment, the multi-layer service insight application 180 is illustrated with the network 16A and the stream 170 providing insight into OTT Content providers 12. Referring to FIG. 13, in an exemplary embodiment, the insight can include a drill-down to identify specific premium/original content like NETFLIX House of Cards, etc.

Advantageously, the dynamic bandwidth allocation systems and methods can use the SDN controller 60 and associated applications to determine the streaming content by performing deep packet inspection (DPI) and further associating the content to a multi-layer service. The dynamic bandwidth allocation systems and methods can use the Bloom filter to allow the Deep Packet Inspection component to identify the packets that belong to the media stream and its segments in a completely transparent manner to the HTTP streaming content players without requiring any changes to storage structure on the web servers. Finally, the dynamic bandwidth allocation systems and methods can dynamically adjust bandwidth by provisioning/deprovisioning services spanning multi-layer (L0, L1 and L2) using the OpenFlow protocol based on the original content identified.

Referring to FIG. 14, in an exemplary embodiment, a block diagram illustrates a server 300 which may be used for the web servers 30, 50, the server 40, the SDN controller 60, etc. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 14 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, a wide area network (WAN), a local area network (LAN), and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 15:
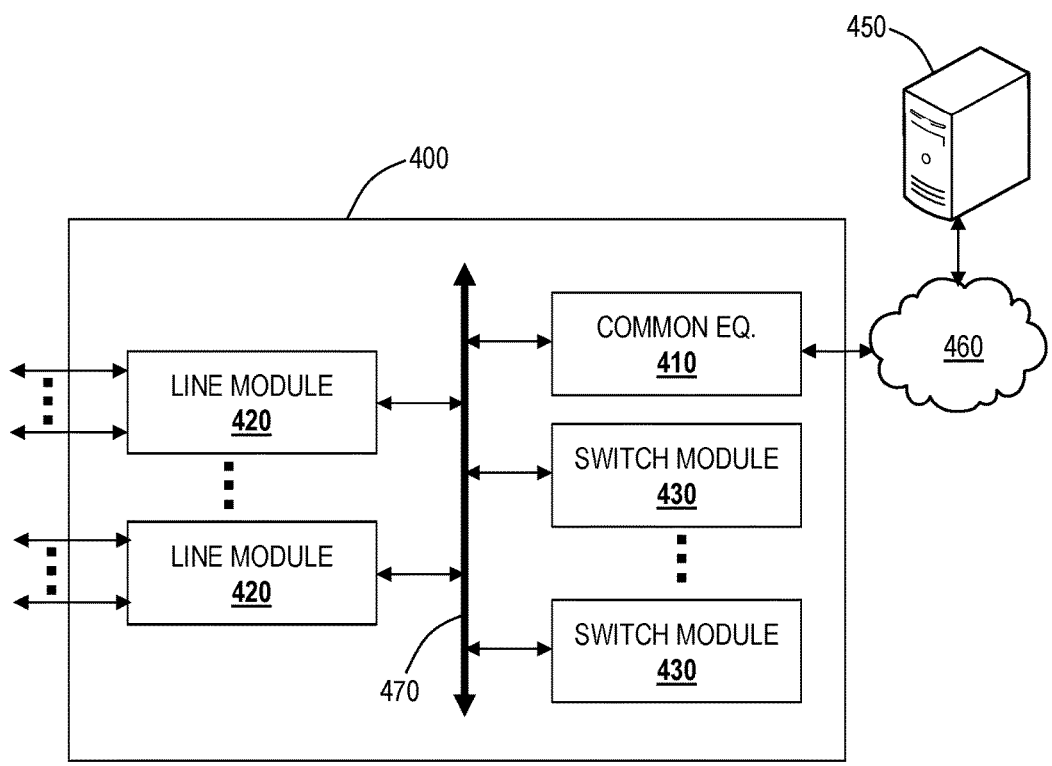
FIG. 15 is a block diagram of an exemplary network element for implementation of the packet switch, the packet/optical switch, etc. for use with the methods and systems described herein.

Referring to FIG. 15, in an exemplary embodiment, a block diagram illustrates an exemplary network element 400 for implementation of the packet switch 70, the packet/optical switch 72, etc. for use with the methods and systems described herein. In an exemplary embodiment, the exemplary network element 400 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the network element 400 can be any of an OTN add/drop multiplexer (ADM), a SONET/SDH/OTN ADM, a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 400 can be any digital system with ingress and egress digital signals and switching therebetween of channels, timeslots, tributary units, etc. utilizing OTN, SONET, SDH, etc. In yet another exemplary embodiment, the network element 400 can be a high-rate Ethernet switch such as the packet switch 70. While the network element 400 is generally shown as an optical network element, the systems and methods contemplated for use with any switching fabric, network element, or network based thereon.

In an exemplary embodiment, the network element 400 includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460. The management system 450 can include a network management system (NMS), element management system (EMS), or the like. Additionally, the common equipment 410 can include a control plane processor configured to operate a control plane as described herein. The common equipment 410 can also provide communication to the SDN controller 60. The network element 400 can include an interface 470 for communicatively coupling the common equipment 410, the line modules 420, and the switch modules 430 therebetween. For example, the interface 470 can be a backplane, mid-plane, a bus, optical or electrical connectors, or the like. The line modules 420 are configured to provide ingress and egress to the switch modules 430 and external to the network element 400. In an exemplary embodiment, the line modules 420 can form ingress and egress switches with the switch modules 430 as center stage switches for a three-stage switch, e.g. a three stage Clos switch. Other configurations and/or architectures are also contemplated. The line modules 420 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 420 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 420 can include wavelength division multiplexing interfaces, short reach interfaces, and the like, and can connect to other line modules 420 on remote network elements, end clients, edge routers, and the like. From a logical perspective, the line modules 420 provide ingress and egress ports to the network element 400, and each line module 420 can include one or more physical ports. The switch modules 430 are configured to switch channels, timeslots, tributary units, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet packet granularity; Digital Signal n (DSn) granularity such as DS0, DS1, DS3, etc.; and the like. Specifically, the switch modules 630 can include both Time Division Multiplexed (TDM) (i.e., circuit switching) and packet switching engines. The switch modules 430 can include redundancy as well, such as 1:1, 1:N, etc. In an exemplary embodiment, the switch modules 430 provide OTN, SONET, or SDH switching.

Those of ordinary skill in the art will recognize the network element 400 can include other components which are omitted for illustration purposes, and that the systems and methods described herein are contemplated for use with a plurality of different network elements with the network element 400 presented as an exemplary type of network element. For example, in another exemplary embodiment, the network element 400 may not include the switch modules 430, but rather have the corresponding functionality in the line modules 420 (or some equivalent) in a distributed fashion. For the network element 400, other architectures providing ingress, egress, and switching therebetween are also contemplated for the systems and methods described herein. In general, the systems and methods described herein contemplate use with any network element providing switching of OTN, SONET, SDH, etc. channels, timeslots, tributary units, wavelengths, packets, etc. Furthermore, the network element 400 is merely presented as one exemplary implementation for the systems and methods described herein. Those of ordinary skill in the art will recognize the systems and methods can be used for practically any type of network element operating at any of Layers 0-2.

Figure 16:
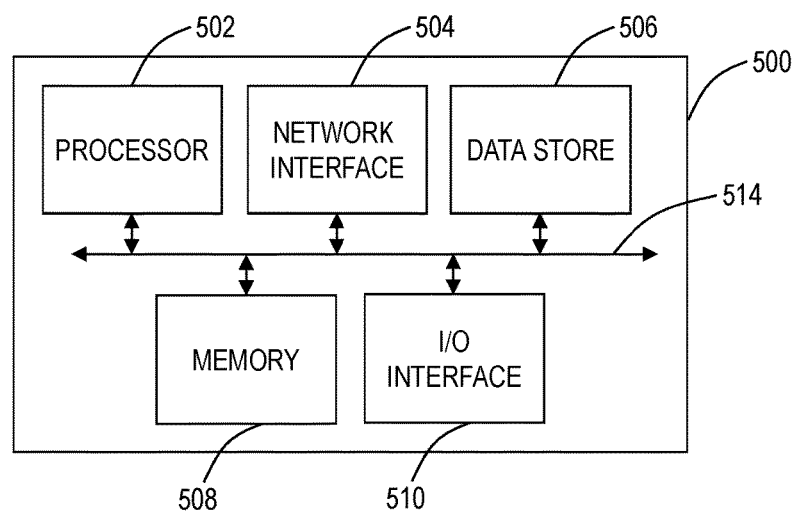
FIG. 16 is a block diagram of a controller to provide control plane processing and/or operations, administration, maintenance, and provisioning (OAM&P) for the network element of FIG. 15.

Referring to FIG. 16, in an exemplary embodiment, a block diagram illustrates a controller 500 to provide control plane processing and/or operations, administration, maintenance, and provisioning (OAM&P) for the network element 400. The controller 500 can be part of common equipment, such as common equipment 410 in the network element 400. The controller 500 can include a processor 502 which is hardware device for executing software instructions such as operating the control plane. The processor 502 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 502 is configured to execute software stored within memory, to communicate data to and from the memory, and to generally control operations of the controller 500 pursuant to the software instructions. The controller 500 can also include a network interface 504, a data store 506, memory 508, an I/O interface 510, and the like, all of which are communicatively coupled therebetween and with the processor 502.

The network interface 504 can be used to enable the controller 500 to communicate on a network, such as to communicate control plane information to other controllers, to the management system 460, to the SDN controller 60, and the like. The network interface 504 can include, for example, an Ethernet card (e.g., 10BaseT, Fast Ethernet, Gigabit Ethernet) or a wireless local area network (WLAN) card (e.g., 802.11a/b/g). The network interface 504 can include address, control, and/or data connections to enable appropriate communications on the network. The data store 506 can be used to store data, such as control plane information, provisioning data, OAM&P data, etc. The data store 506 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 506 can incorporate electronic, magnetic, optical, and/or other types of storage media. The memory 508 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 508 may incorporate electronic, magnetic, optical, and/or other types of storage media. Note that the memory 508 can have a distributed architecture, where various components are situated remotely from one another, but may be accessed by the processor 502.

The I/O interface 510 includes components for the controller 500 to communicate to other devices in a node, such as through the local interface 514. The components (502, 504, 506, 508, 510) are communicatively coupled via a local interface 514. The local interface 514 and the I/O interface 510 can be, for example but not limited to, one or more buses or other wired or wireless connections, as is known in the art. The local interface 514 and the I/O interface 510 can have additional elements, which are omitted for simplicity, such as controllers, buffers (caches), drivers, repeaters, and receivers, among many others, to enable communications. Further, the local interface 514 and the I/O interface 510 can include address, control, and/or data connections to enable appropriate communications among the aforementioned components.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
operating a multi-layer Software-Defined Networking (SDN) network, wherein the multi-layer SDN network operates at any of Layers 0, 1, and 2, Layer 0 being wavelengths, Layer 1 being Time Division Multiplexing, and Layer 2 being packets;
uniquely identifying streaming content at Layer 7 over the multi-layer SDN network through deep packet inspection by an SDN application that utilizes a Bloom filter embedded in a resource identifier in the streaming content that is transparent to streaming content clients and that is hidden while the streaming content is hosted on a server via resource identifier rewriting;
associating the streaming content at Layer 7 to a multi-layer service on the SDN network at any of Layers 0, 1, and 2 based on the uniquely identifying and the Bloom filter embedded in the resource identifier;
monitoring the streaming content on the SDN network over the multi-layer service using the Bloom filter embedded in the resource identifier; and
dynamically adjusting bandwidth of the multi-layer service that is currently provisioned on the SDN network at any of Layers 0, 1, and 2 based on the monitoring, wherein the bandwidth comprises one or more of wavelength connectivity and Time Division Multiplexing connectivity, wherein the one or more of the wavelength connectivity and the Time Division Multiplexing connectivity are adjusted based on the monitoring at the higher layers.

2. The method of claim 1, further comprising:
dynamically adjusting the bandwidth of the multi-layer service utilizing Open Flow on the SDN network.

3. The method of claim 1, wherein the streaming content comprises Hypertext Transfer Protocol (HTTP) adaptive streaming.

4. The method of claim 1, wherein the uniquely identifying, the associating, and the monitoring is performed by an SDN controller.

5. The method of claim 1, further comprising:
receiving the streaming content from a content provider with the embedded Bloom filter in the resource identifier; and
tracking the streaming content associated with the content provider over the SDN network.

6. The method of claim 1, further comprising:
prior to the uniquely identifying and at a content provider, initializing a master N-bit Bloom filter with k different hash functions associated with the Bloom filter; and
repeating each of the following steps for each media segment comprising segment data produced by the content provider:
initializing an M-bit Bloom filter with L different hash functions associated with the filter;
as each segment is produced, taking a first set of bytes of the segment data and performing an M-bit Bloom filter addition by feeding the segment data through each of the L hash function and setting the corresponding M-bit Bloom filter bits;
performing a master N-bit Bloom filter addition by feeding the data through each of the K hash function and setting the corresponding Bloom filter bits; and
creating a Uniform Resource Indicator (URI) for every media segment that enables its clients to obtain the segment data.

7. The method of claim 6, further comprising:
embedding the Bloom filter in the URI of every media segment file for the uniquely identifying.

8. A Software-Defined Networking (SDN) controller, comprising:
a network interface communicatively coupled to one or more network devices in a multi-layer Software-Defined Networking (SDN) network, wherein the multi-layer SDN network operates at any of Layers 0, 1, and 2, Layer 0 being wavelengths, Layer 1 being Time Division Multiplexing, and Layer 2 being packets;
a processor communicatively coupled to the network interface; and
memory storing instructions that, when executed, cause the processor to:
uniquely identify streaming content on higher layers relative to the multi-layer SDN network through deep packet inspection by an SDN application that utilizes a Bloom filter embedded in a resource identifier in the streaming content that is transparent to streaming content clients and that is hidden while the streaming content is hosted on a server via resource identifier rewriting;
associate the streaming content at Layer 7 to a multi-layer service on the SDN network at any of Layers 0, 1, and 2 based on the uniquely identifying and the Bloom filter embedded in the resource identifier;
monitor the streaming content on the SDN network over the multi-layer service using the Bloom filter embedded in the resource identifier; and
dynamically adjust bandwidth of the multi-layer service that is currently provisioned on the SDN network at any of Layers 0, 1, and 2 based on the monitoring, wherein the bandwidth comprises one or more of wavelength connectivity and Time Division Multiplexing connectivity, wherein the one or more of the wavelength connectivity and the Time Division Multiplexing connectivity are adjusted based on the monitoring at the higher layers.

9. The SDN controller of claim 8, wherein the instructions, when executed, further cause the processor to:
dynamically adjust the bandwidth of the multi-layer service utilizing OpenFlow on the SDN network.

10. The SDN controller of claim 8, wherein the streaming content comprises Hypertext Transfer Protocol (HTTP) adaptive streaming.

11. The SDN controller of claim 8, wherein the instructions, when executed, further cause the processor to:
perform the deep packet inspection utilizing the Bloom filter embedded in the resource identifier of the streaming content, wherein the embedded Bloom filter is transparent to content players and does not require changes to storage on associated web servers for the streaming content.

12. The SDN controller of claim 8, wherein the instructions, when executed, further cause the processor to:
receive the streaming content from a content provider with the embedded Bloom filter in the resource identifier; and
track the streaming content associated with the content provider over the SDN network.

13. A network, comprising:
a multi-layer Software-Defined Networking (SDN) network, wherein the multi-layer SDN network operates at any of Layers 0, 1, and 2, Layer 0 being wavelengths, Layer 1 being Time Division Multiplexing, and Layer 2 being packets;
a content provider comprising at least one web server communicatively coupled to the SDN network; and
an SDN controller communicatively coupled to the SDN network comprising a processor and memory storing instructions that, when executed, cause the processor to:
uniquely identify streaming content at Layer 7 from the content provider over the multi-layer SDN network through deep packet inspection by an SDN application that utilizes a Bloom filter embedded in a resource identifier in the streaming content that is transparent to streaming content clients and that is hidden while the streaming content is hosted on a server via resource identifier rewriting;
associate the streaming content at Layer 7 to a multi-layer service on the SDN network at any of Layers 0, 1, and 2 based on the uniquely identifying and the Bloom filter embedded in the resource identifier;
monitor the streaming content on the SDN network over the multi-layer service using the Bloom filter embedded in the resource identifier; and
dynamically adjust bandwidth at any of Layers 0, 1, and 2 of the multi-layer service that is currently provisioned on the SDN network utilizing OpenFlow based on the monitoring, wherein the bandwidth comprises one or more of wavelength connectivity and Time Division Multiplexing connectivity, wherein the one or more of the wavelength connectivity and the Time Division Multiplexing connectivity are adjusted based on the monitoring at the higher layers.

14. The network of claim 13, wherein the streaming content comprises Hypertext Transfer Protocol (HTTP) adaptive streaming.

15. The network of claim 13, wherein the SDN controller is configured to:
perform the deep packet inspection utilizing the Bloom filter embedded in the resource identifier of the streaming content by the content provider, wherein the embedded Bloom filter is transparent to content players and does not require changes to storage on associated web servers for the streaming content.

16. The network of claim 13, wherein the content provider comprises a server configured to:
prior to the uniquely identifying, initialize a master N-bit Bloom filter with k different hash functions associated with the Bloom filter; and
repeat each of the following steps for each media segment comprising segment data produced by the content provider:
initialize an M-bit Bloom filter with L different hash functions associated with the filter;
as each segment is produced, take a first set of bytes of the segment data and performing an M-bit Bloom filter addition by feeding the segment data through each of the L hash function and setting the corresponding M-bit Bloom filter bits;
perform a master N-bit Bloom filter addition by feeding the data through each of the K hash function and setting the corresponding Bloom filter bits; and
create a Uniform Resource Indicator (URI) for every media segment that enables its clients to obtain the segment data.

\* \* \* \* \*